United States Patent [19]

Thornton, Jr. et al.

[11] 4,334,782
[45] Jun. 15, 1982

[54] METHOD AND APPARATUS FOR EXPRESSING RELATIVE BRIGHTNESS OF ARTIFICIAL ILLUMINATION AS PERCEIVED BY THE AVERAGE OBSERVER

[75] Inventors: William A. Thornton, Jr., Cranford; Edward Chen, Glen Rock; Edward W. Morton, Teaneck; Dorothy Rachko, Passaic, all of N.J.

[73] Assignee: Westinghouse Electric Corp., Pittsburgh, Pa.

[21] Appl. No.: 181,338

[22] Filed: Aug. 25, 1980

[51] Int. Cl.³ .............................................. G01J 3/50
[52] U.S. Cl. .................................... 356/406; 356/419
[58] Field of Search ............... 356/222, 225, 402, 406, 356/407, 416, 419, 405; 364/526; 250/226

[56] References Cited

U.S. PATENT DOCUMENTS

| | | | |
|---|---|---|---|
| 2,933,010 | 4/1960 | Vlahos | 356/416 |
| 3,363,505 | 1/1968 | Stone | 356/225 |
| 3,818,198 | 6/1974 | Walker et al. | 364/526 |
| 4,176,294 | 11/1979 | Thornton, Jr. | 313/485 |

OTHER PUBLICATIONS

Judd, *Illuminating Engineering*, Feb. 1958, pp. 61–71.
Walker, *Applied Optics*, vol. 11, No. 9, Sep. 1972, pp. 2060–2068.
Walker et al., *Journal of the SMPTE*, vol. 83, No. 9, Sep. 1974, pp. 737–741.

*Primary Examiner*—F. L. Evans
*Attorney, Agent, or Firm*—W. D. Palmer

[57] ABSTRACT

Method and apparatus for expressing as a number the relative brightness of artificial illumination as it is perceived by the average observer. There is extracted (i.e., detected) from the illumination to be measured, a blue-appearing narrow band, a green-appearing narrow band, a yellow-appearing narrow band and a red-orange-appearing narrow band. From these extracted bands are generated six different signals: a signal expressed as (aB) where (a) is about 0.23 and (B) is the watts of energy in the blue band, a signal expressed as (bG) where (b) is about 0.97 and (G) is the watts of energy in the green band, a signal expressed as (cR) where (c) is about 0.33 and (R) is the watts of energy in the red-orange band, a signal expressed as (dY) where (d) is about 0.19 and (Y) is the watts of energy in the yellow band, a signal expressed as (eG) where (e) is about 0.25 and (G) is the watts of energy in the green band, and a signal expressed as (fR) where (f) is about 0.25 and (R) is the watts of energy in the red-orange band. These signals are combined in the following manner: aB+bG+cR−dY+(the larger of eG and fR minus the smaller of eG and fR). These combined signals are expressed as a number which is indicative of the relative brightness of artificial illumination as perceived by the average observer.

7 Claims, 4 Drawing Figures

METHOD AND APPARATUS FOR EXPRESSING RELATIVE BRIGHTNESS OF ARTIFICIAL ILLUMINATION AS PERCEIVED BY THE AVERAGE OBSERVER

BACKGROUND OF THE INVENTION

This invention relates to method and apparatus for measuring brightness of illumination and, more particularly, to a method and apparatus for expressing as a number the relative brightness of artificial illumination as it is perceived by the average observer.

Early in this century, experiments with so-called flicker photometers were interpreted to mean that the normal human visual system responds to light of different wavelengths in accordance with what is now known as the standard photopic curve. The need for some sort of detector to place values on brightness measurements was very great and the photopic curve was adopted throughout the world as if it were indeed an accurate measurement of human vision under ordinary conditions. This curve as adopted forms the basis of the lumen and the footcandle, and hence is now the international standard for artificial illumination. A meter or detector which is provided with this response is said to measure luminance, expressed in footcandles, or the metric unit lux.

Unfortunately, a detector such as a footcandle meter, which is provided with the response of the photopic curve, usually disagrees with a human observer in the comparison of two different illumination sources when the spectral power distributions of the two sources differ. As stated by W. D. Wright in "The Measurement of Colour", fourth edition (1969) Van Nostrand Reinhold, page 66, "The embarrassing situation can arise that a fluorescent lamp A of one colour may look brighter than a lamp B of slightly different colour, although the lumen output of B as measured photometrically is greater than that of A". In other words, artificial lighting sources would be ranked in one way by their measured luminance, and in a different way by their brightness as perceived by an average observer.

Another problem with the footcandle meter is that it is unfailingly additive. Thus, fifty footcandles of one illuminant, superimposed on fifty foot candles of any other illuminant, will be measured by the meter as a total of one hundred footcandles. Again, the experts in the field do not agree with this law of additivity, which necessarily applies to footcandle measurements, but does not apply to perceived brightness. In explanation, white light, upon removal of the red component, becomes bluish-green and brighter to the average observer than the original white light. Thus, by removing red light from a white mixture, a brighter light is produced. The footcandle meter would disagree with the observer in this experiment also, since the removal of the red-footcandle component from the white light can only reduce the footcandle content of that light, even though its brightness increases as perceived by the average observer.

A third problem encountered with the footcandle meter can be illustrated by illuminating identical furnished rooms with two commercial lamps which have the same source color, but different spectral power distributions. If the two rooms are adjusted to have the identical footcandle luminance, one room will normally appear at least somewhat brighter than the other to the average observer.

Still another problem with the footcandle meter is that when apparent brightnesses of different colors of illumination are involved, very substantial differences between the relative values of luminance and perceived brightness may exist. As an example, yellow-appearing illumination which is adjusted to provide the same footcandle luminance as violet-appearing illumination will be much dimmer in perceived brightness. According to established experiments, this difference in perceived brightness may be as great as 975%, even though the footcandle meter reads both sources as having equal footcandle levels, see P. L. MacAdam comments in Illuminating Engineering, February 1958, page 70.

SUMMARY OF THE INVENTION

There is provided a method and apparatus for expressing as a number the relative brightness of artificial illumination as it is perceived by the average observer. There is first extracted (i.e., detected) from the illumination to be measured, portions of the illumination spectrum which fall within the following radiation bands: a blue-appearing narrow band having a mean wavelength of from about 440 nm to about 460 nm, a green-appearing narrow band having a mean wavelength of from about 520 nm to about 540 nm, a yellow-appearing narrow band having a mean wavelength of from about 570 nm to about 590 nm, and a red-orange-appearing narrow band having a mean wavelength of from about 610 nm to about 630 nm. There is generated from these four extracted radiation bands, a series of six signals which bear the following proportional relationship to one another: a signal expressed as (aB) where (a) is a coefficient of about $0.23 \pm 10\%$ and (B) is the watts of radiation energy in the blue-appearing band, a signal expressed as (bG) where (b) is a coefficient of about $0.97 \pm 10\%$ and (G) is the watts of radiation energy in the green-appearing band, a signal expressed as (cR) where (c) is a coefficient of about $0.33 \pm 10\%$ and (R) is the watts of radiation energy in the red-orange-appearing band, a signal expressed as (dY) where (d) is a coefficient of about $0.19 \pm 10\%$ and (Y) is the watts of radiation energy in the yellow-appearing band, a signal expressed as (eG) where (e) is a coefficient of about $0.25 \pm 10\%$ and (G) is the watts of radiation energy in the green-appearing band, and a signal expressed as (fR) where (f) is a coefficient of about $0.25 \pm 10\%$ and (R) is the watts of radiation energy in the red-orange-appearing band. These generated signals are combined in the following manner: $aB+bG+cR-dY+$ (the larger of eG and fR minus the smaller of eG and fR). The combined signals are then expressed as a number which represents the relative brightness of the artificial illumination as it is perceived by the average observer. There is also provided an apparatus which will perform these functions as a perceived brightness meter.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENT

Figure 1:
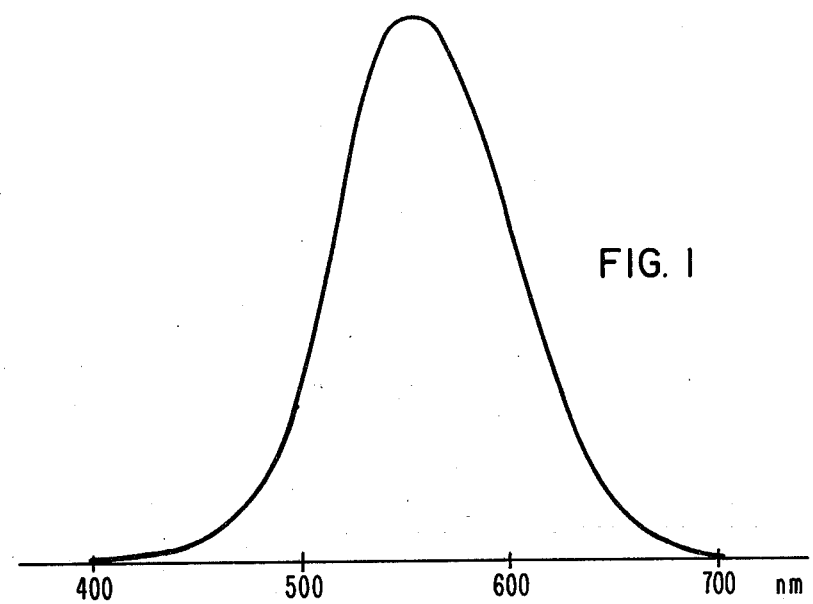
FIG. 1 is a graph of relative response versus wavelength illustrating the so-called standard photopic curve which forms the basis for the present standards of lumen and footcandle (lux in the metric system)

In FIG. 1 is shown the standard photopic curve which forms the basis for the science of illumination. The national standard of light is a black body radiator operated at the temperature of solidification of platinum. The candela (unit of luminous intensity) is defined as the luminous intensity of 1-60th of one square centimeter of projected area of such a radiator. Values for standards having other spectral distributions are derived by use of the accepted spectral luminous efficiency data which is all based upon the photopic curve as shown in FIG. 1. For a further discussion of the science of lighting and the international standards which have been established, reference should be made to IES Lighting Handbook, fourth edition, published by the Illuminating Engineering Society, New York, N.Y., Section 3, "Standards and Nomenclature", pages 3-1 to 3-13. The present method and apparatus discard these internationally accepted standards in order to express as a number the relative brightness of artificial illumination as it is perceived by the average observer. The perceived brightness is expressed only as a number since no standards for such measured brightness have been established and certainly, the footcandle, or lux, which is the present standard, cannot be used.

In U.S. Pat. No. 4,176,294, dated Nov. 27, 1979 to W. A. Thornton, one of the present applicants, is set forth the suggestion that three peaks of spectral response of the normal human visual system are centered approximately at 450 nm, 540 nm and 610 nm, see FIG. 3 of the patent. Curves which somewhat correspond to those shown in the patent, but which are modified for spectral response rather than color rendering index, are set forth in FIG. 2 and are identified as B, G and R. If one were to use three different detectors to assess the blue content B, the green content G and the red content R of the incoming light, the summation of these three components could be set forth as a measure of illumination. Using only three signals will not serve as a proper correlation of perceived brightness, however, since some of the energies of the signals G and R are somehow subtractive, rather than additive, as described in the background section. Rephrasing this, when power at "green wavelengths" and power at "red wavelengths" are present in the spectral power distribution of a light, the perceived brightness of the mixture is less than the sum of their perceived brightnesses separately.

Figure 3:
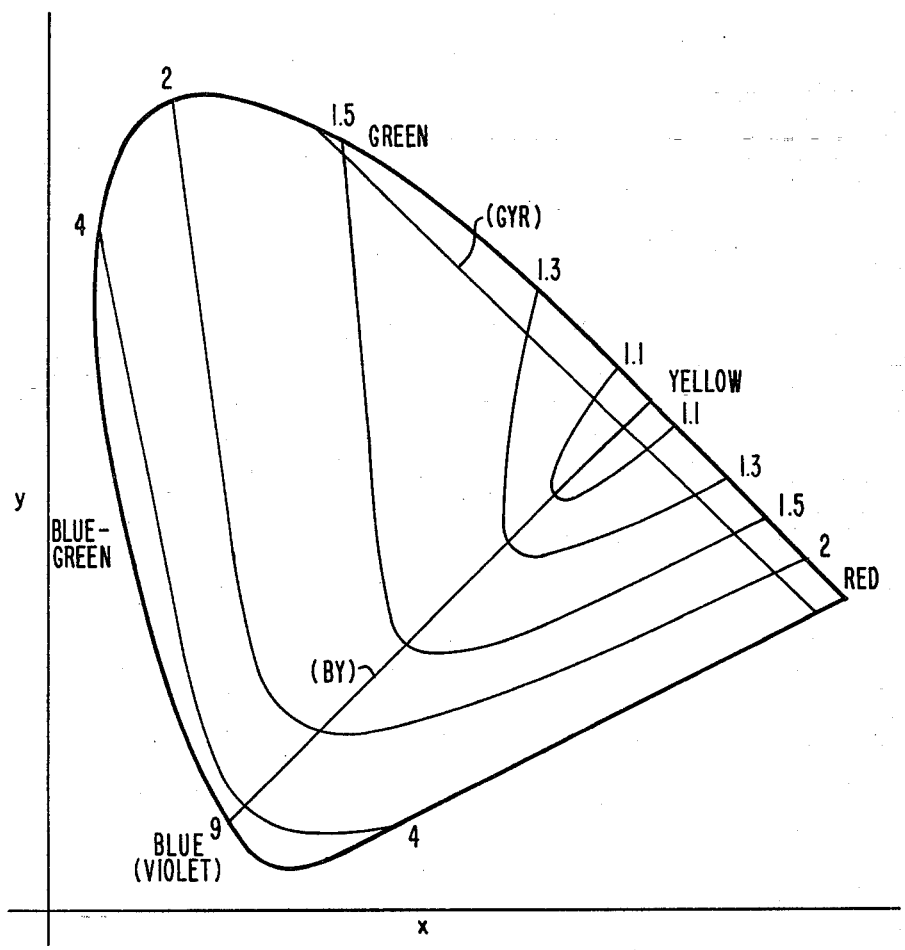
FIG. 3 is a representation of the x, y-chromaticity diagram of the ICI system having superimposed thereon contours of equal perceived brightness per measured footcandle.

Additional experiments have been conducted by others in the field to establish contours of equal perceived brightness per measured footcandle and the results of these experiments are set forth in FIG. 3. Briefly, where yellow light is involved, the ratio of perceived brightness to measured luminance can be expressed as unity. If the average observer is comparing the perceived brightness of blue light to the luminance of this same blue light as measured with a footcandle meter, however, the perceived brightness will be about 900% greater than the measured footcandle luminance. Expressing this in another fashion, if the average observer were to compare one measured footcandle of yellow illumination and one measured footcandle of blue illumination, the blue illumination would appear to be nine times as bright as the yellow illumination.

Figure 2:
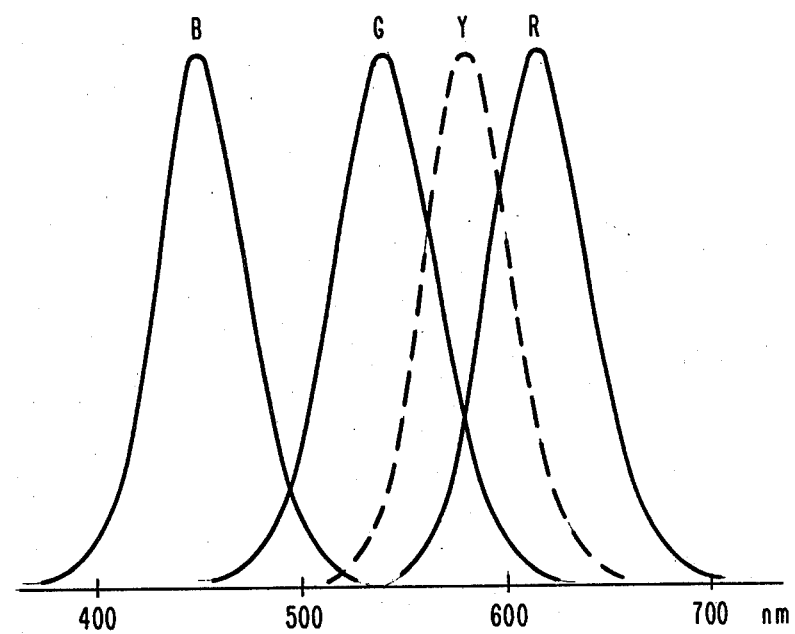
FIG. 2 is a graph of sharply peaked spectral curves designated B, G, Y and R which were used in deriving the present method and designing the present apparatus.

The general shape of the contours of perceived brightness per footcandle as shown in FIG. 3 show that yellowish lights are dimest, per measured footcandle, both along the blue to yellow (BY) axis of the color diagram and also along the green-yellow-red (GYR) axis. Brightness per footcandle is relatively high for green light and for red light, but when power at green wavelengths and power at red wavelengths are both present in a light, the color of the light is shifted toward the yellow, and perceived brightness per footcandle decreases. In other words, when the green-content of the light is balanced by the red content of a light, the color of the light becomes yellow and brightness per footcandle decreases. Thus perceived brightness may vary as: $|G-R|$, so that the greater the imbalance between the green content and the red content, the brighter the perceived light. The perceived brightness per footcandle contours also suggest that the greater the blue content and the smaller the yellow content, the brighter the light, so that perceived brightness may vary as $B-Y$, where Y is the yellow content which can be expressed by a detector responding as the dashed-curve Y as shown in FIG. 2.

It is found that brightness will also vary in accordance with the established measurement of footcandles, so that perceived brightness might well be expressed as equal to the summation of measured footcandles plus $B-Y+|G-R|$. Through a long series of experiments, it has been determined that a four-detector circuit based on spectral sensitivities such as shown in FIG. 2 can provide a very accurate measurement of perceived brightness. In accordance with these experiments, perceived brightness is equal to:

$$aB + bG + cR - dY + |eG - fR|.$$

In this formulation, a is equal to about 0.23, b is equal to about 0.97, c is equal to about 0.33, d is equal to about 0.19, e is equal to about 0.25 and f is equal to about 0.25. Each of these coefficients can vary by about ±10%.

In accordance with the present method, which expresses as a number the relative brightness of artificial illumination as it is perceived by the average observer, there are extracted (i.e., sampled) from the illumination to be measured, portions of the illumination spectrum which fall within selected radiation bands as set forth by the bands designated B, G, Y and R, as shown in FIG. 2. As a specific example, the radiation peaks for these four narrow bands occur at about 450 nm for the blue, about 540 nm for the green, about 575 nm for the yellow, and about 610 nm for the red-orange. There is generated from these four extracted radiation bands, a series of six signals which bear the following proportional relationship to one another: a signal expressed as (aB) where (a) is a coefficient of about 0.23±10% and (B) is the watts of radiation energy in the blue-appearing band, a signal expressed as (bG) where (b) is a coefficient of about 0.97±10% and (G) is the watts of radiation energy in the green-appearing band, a signal expressed as (cR) where (c) is a coefficient of about 0.33±10% and (R) is the watts of radiation energy in the red-orange-appearing band, a signal expressed as (dY) where (d) is a coefficient of about 0.19±10% and (Y) is the watts of radiation energy in the yellow-appearing band, a signal expressed as (eG) where (e) is a coefficient of about 0.25±10% and (G) is the watts of radiation energy in the green-appearing band, and a signal expressed as (fR) where (f) is a coefficient of about 0.25±10% and (R) is the watts of radiation energy in the red-appearing band. The foregoing generated six signals are combined in the following manner: aB+bG+cR−dY+(the larger of eG and fR minus the smaller of eG and fR). The foregoing combined signals are then expressed as a number which represents the relative brightness of artificial illumination as it is perceived by the average observer.

While the extracted radiation bands preferably have individual peaks which occur at about 450 nm, about 540 nm, about 575 nm and about 610 nm, the mean wavelength of these bands can respectively vary from about 440 nm to about 460 nm, from about 520 nm to about 540 nm, from about 570 nm to about 590 nm, and from about 610 nm to about 630 nm. In addition, the half width of the narrow extracted bands can vary from about 30 nm to about 60 nm when measured at a radiation intensity which is about 50% of the maximum measured radiation intensity thereof.

Figure 4:
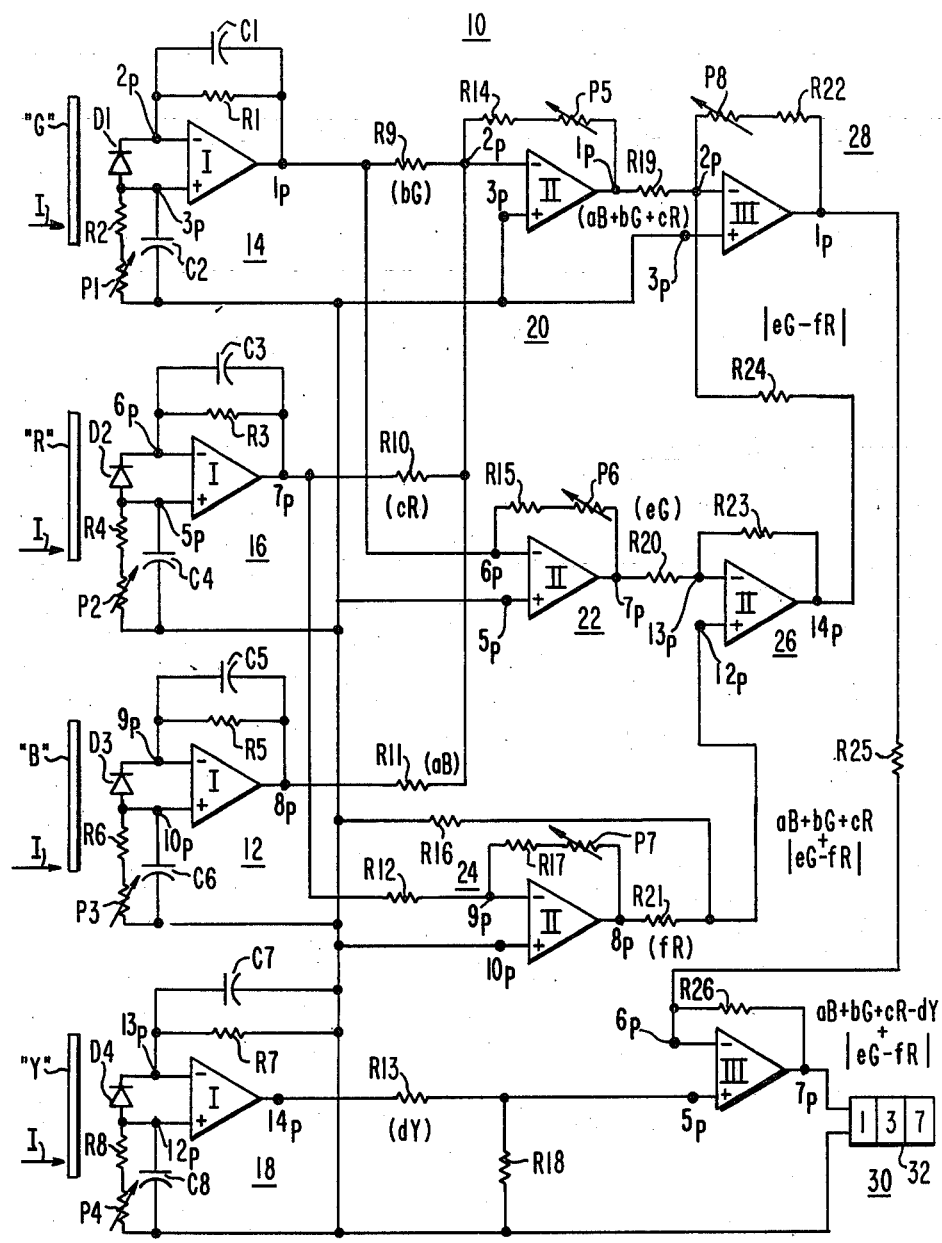
FIG. 4 is a circuit diagram for a preferred embodiment of the present brightness meter.

A schematic and circuit diagram of a brightness meter 10 which is designed in accordance with the present invention is shown in FIG. 4. The artificial illumination to be measured is designated "I" and impinges upon individual interference filters designated "G", "R", "B" and "Y". As a specific example, the filter "G" has a maximum of transmission at about 540 nm and a half width of 59 nm. The filter designated "R" has a maximum of transmission at about 610 nm and a half width of 46 nm. The filter designated "B" has a maximum of transmission at 450 nm and a half width of 46 nm. The filter designated "Y" has a maximum of transmission at about 575 nm and a half width of 48 nm. These filters serve to extract from the illumination to be measured, portions of the illumination spectrum which fall within the indicated blue-appearing narrow band, the green-appearing narrow band, the yellow-appearing narrow band and the red-orange-appearing narrow band.

Four different photodiode means D1-D4 are actuated respectively by the green-appearing radiations, the red-appearing radiations, the blue-appearing radiations and the yellow-appearing radiations, in order to generate individual output electrical signals which are proportional to the watts of energy in each of the different radiation bands.

A first operational amplifier circuit means 12 has its input connected to the output of the photodiode means D3 which senses the blue-appearing band and generates an output electrical signal which is representative of the desired signal aB, where a is about 0.23±10%.

A second operational amplifier circuit means 14 has its input connected to the output of the photodiode means D1 which senses the green-appearing band in order to generate an output electrical signal which is representative of the signal bG, where (b) is about 0.97±10%.

A third operational amplifier circuit means 16 has its input connected to the output of the photodiode means D2 which senses the red-orange-appearing radiations to generate an output electrical signal which is representative of the signal cR where (c) is about 0.33±10%.

A fourth operational amplifier circuit means 18 has its input connected to the output of the photodiode means D4 which senses the yellow-appearing band to generate an output signal which is representative of dY where (d) is about 0.19±10%. It should be understood that the foregoing generated signals can vary with respect to their coefficients, but their coefficients a, b, c and d should be maintained proportional to one another within the foregoing specified values.

A first summation amplifier circuit means 20 has its input connected to the outputs of the first, second and third operational amplifier circuit means 12, 14 and 16, in order to generate an output electrical signal which is representative of the sum of the signals aB, bG and cR.

A fifth operational amplifier circuit means 22 has its input connected in circuit with an output portion of the second operational amplifier circuit means 14 in order to generate an output signal which is representative of the signal eG where (e) is about 0.25±10 percent.

A sixth operational amplifier circuit 24 has its input connected in circuit with an output portion of the third operational amplifier circuit means 16 in order to generate an output electrical signal which is representative of the signal fR where (f) is about 0.25±10%.

A first differential amplifier circuit means 26 has its input connected to the outputs of said fifth and sixth operational amplifier circuit means 22 and 24 to generate an output signal which is representative of the larger of the signals eG and fR minus the smaller of the signals eG and fR.

A second summation amplifier circuit means 28 has its input connected in circuit with the output of said first summation amplifier circuit means 20 and the output of said first differential amplifier circuit means 26 in order to generate an output electrical signal which is representative of the sum of the signals aB+bG+cR+(the larger of eG and fR minus the smaller of eG and fR).

A second differential amplifier circuit means 30 has its input connected to the output of the second summation amplifier circuit means 28 and the output of said fourth operational amplifier means 18 in order to generate an electrical signal which is representative of the sum of the signals aB+bG+cR+(the larger of eG and fR minus the smaller of eG and fR) minus dY. Finally, there is connected to the output of the second differential amplifier circuit means 30 a digital voltmeter display means 32 in order to display the output electrical signal of circuit 30 as a number. The digital voltmeter 32 could be replaced by an analog-type display if desired. The individual signals as generated are also shown on the circuit diagram.

With respect to circuit details, following is a component chart listing the individual components of the circuit 10 as shown in FIG. 4.

| COMPONENT CHART | |
|---|---|
| Element | Identification |
| D 1, 2, 3, 4 | Centronic, Mountainside, N.J. Model OSD-52 |
| P 1-7 | 50 KΩ pot. |
| P 8 | 100 KΩ pot. |
| R 1, 3, 5, 7 | 470 KΩ |
| R 2, 4, 6, 8 | 100 KΩ |
| R 9, 10, 11, 17, 22 | 10 KΩ |
| R 12 | 22 KΩ |
| R 13 | 32 KΩ |
| R 14, 15 | 15 KΩ |
| R 16, 18 | 68 KΩ |

-continued

COMPONENT CHART

| Element | Identification |
| --- | --- |
| R 19, 20, 21 | 27 KΩ |
| R 23, 26 | 47 KΩ |
| R 24, 25 | 33 KΩ |
| C 1, 3, 5, 7 | 0.1 μF |
| C 2, 4, 6, 8 | 0.068 μF |
| Amp I, II, III | Motorola - Quad Differential Input Operational Amplifiers, MC 3403P,L |

Each of the quad differential amplifiers I, II and III as shown in FIG. 4 is a four element device having pins designated 1 through 14. Power input to the amplifiers is made through pins 4 (positive terminal) and pins 11 (negative terminal). All of the pins of amplifiers I and II are connected in circuit with the pin connections and their polarity being shown in FIG. 4. Only two of the elements of amplifier III are utilized with the pin connections and their polarity being shown. Other elements in the circuit provide for waveform smoothing, with the proportional values of the coefficients a, b, c, d, e and f and signal values set by potentiometers P 1-8.

In actual test results conducted with a large number of observers, identical side-by-side room displays were illuminated with different types of fluorescent illumination and the results correlated against the present perceived brightness meter and a footcandle meter. In all cases, the levels of illumination were set to the same footcandle values, indicated as unity, and the ratio of average brightness as indicated by the human observers and the readings of the perceived brightness meter are also set forth. The abbreviations are WW for a warm white correlated color temperature (3000° K.) fluorescent lamp, Day for a daylight color (6500° K.) fluorescent lamp, CW indicates a cool white color (4100° K.) fluorescent lamp, Std. indicates standard commercial lamps which incorporate halophosphate phosphor, and the lamps indicated as "three band" were constructed in accordance with the aforementioned U.S. Pat. No. 4,176,294 utilizing a three-component phosphor blend of divalent-europium-activated strontium chlorophosphate, manganese-activated zinc silicate, and trivalent-europium-activated yttrium oxide, to produce a three-band lamp. The perceived brightness versus footcandle brightness closely conforms to the contours as shown in FIG. 3. Also, as set forth in this Table, the perceived brightnesses of the three-band lamps are approximately one-quarter to one-third greater than that of the compared commercial fluorescent lamp of the same color, when the measured footcandle luminances are the same.

TABLE I

Perceived Brightness Meter
Perceived-Brightness-per-Footcandle Ratio
(First Fluorescent Lamp/Second Fluorescent Lamp)

| | Human Observers | Brightness Meter | FC Meter (Both Lamps) |
| --- | --- | --- | --- |
| Std. WW vs Std. Day | 0.78 | 0.74 | 1 |
| Std. WW vs. Three Band CW | 0.77 | 0.73 | 1 |
| Std. WW vs Std. CW | 0.92 | 0.90 | 1 |
| Std. CW vs Std. Day | 0.87 | 0.82 | 1 |
| Yellow-Blue CW vs. Std. CW | 0.78 | 0.74 | 1 |
| Std. CW vs Three Band CW | 0.80 | 0.81 | 1 |
| Std. WW vs Three Band WW | 0.75 | 0.73 | 1 |

TABLE I-continued

Perceived Brightness Meter
Perceived-Brightness-per-Footcandle Ratio
(First Fluorescent Lamp/Second Fluorescent Lamp)

| | Human Observers | Brightness Meter | FC Meter (Both Lamps) |
| --- | --- | --- | --- |
| Yellow vs Yellow | (1.00)* | (1.00)* | 1 |
| Green vs Yellow | 2.0 | 1.9 | 1 |
| Red vs Yellow | 2.0 | 1.8 | 1 |
| Blue vs Yellow | 9.0 | 10.3 | 1 |

*Arbitrarily set at 1.00 as a standard

There have existed for many years two basic, and conflicting, theories of color vision, namely the Young-Helmholtz three-component theory and the Hering opponent-color theory. The Young-Helmholtz theory is derived from the fact that any color can be represented by a unique mixture of three differently colored lights and assumes that there are three kinds of receptors in the eye that react selectively to light according to its wavelength. In effect, this theory attempts to explain color vision in terms of the stimulus. The Hering theory is based upon visual responses and assumes that there are six basic unitary colors (red, yellow, green, blue, white, and black). It is also assumed that visual activity is found in three pairs of processes with two members of each pair being opposites, i.e., there are blue-yellow, green-red, and white-black pairs of processes which are performed in the brain. Both of these theories, and several variations of each, have a number of limitations in that they do not explain or are not consistent with all of the questions and observations regarding color vision.

The foregoing method and apparatus provide an effective correlation between observer-perceived brightness and measured brightness for any of a wide variety of lights of differing colors or for lights of the same colors which are composed of differing spectral power distributions. There is also achieved an apparent resolution of the previous conflicting theories of Young-Helmholtz and Hering. In explanation, the operation of the three-receptor mechanisms of the eye per se, which form the basis of Young-Helmholtz, are incorporated in the present method and apparatus as are the opponent-color processes of Hering (i.e., blue minus yellow and green minus red), which apparently are performed in the brain. The very close correlations between observer-perceived brightness and the measured brightness obtained by the present method and apparatus are best demonstrated by reference to Table I. The close correlations of these measurements are in great contrast to the large deviations present when the luminance is expressed in terms of our present international standards, i.e. footcandles or lux.

The present apparatus as shown in FIG. 4 can be expected to undergo considerable further refinements with respect to size and cost by replacing the individual amplifier circuit components with microprocessor technology. Such a brightness meter should provide a very accurate numerical measurement of the relative brightness of artificial illumination as it is perceived by the average observer. The units of measurement, of course, have yet to be established. The meter can be used either to lock directly at a source of illumination to measure its perceived brightness or it can be used to lock into a room to measure the brightness of the room as it is normally viewed by an average observer. In this manner, the various reflectivities and colors of the items being illuminated will also be taken into consideration in order to obtain a numerical value of relative brightness of the illuminated room.

We claim:

1. The method of expressing as a number the relative brightness of artificial illumination as it is perceived by the average observer, which method comprises:

extracting from the illumination to be measured, portions of the illumination spectrum which fall within the following radiation bands: a blue-appearing narrow band having a mean wavelength of from about 440 nm to about 460 nm, a green-appearing narrow band having a mean wavelength of from about 520 nm to about 540 nm, a yellow-appearing narrow band having a mean wavelength of from about 570 nm to about 590 nm, and a red-orange-appearing narrow band having a mean wavelength of from about 610 nm to about 630 nm;

generating from said four extracted radiation bands, a series of six signals which bear the following proportional relationship to one another: a signal expressed as (aB) where (a) is a coefficient of about 0.23±10% and (B) is the watts of radiation energy in said blue-appearing band, a signal expressed as (bG) where (b) is a coefficient of about 0.97±10% and (G) is the watts of radiation energy in said green-appearing band, a signal expressed as (cR) where (c) is a coefficient of about 0.33±10% and (R) is the watts of radiation energy in said red-orange-appearing band, a signal expressed as (dY) where (d) is a coefficient of about 0.19±10% and (Y) is the watts of radiation energy in said yellow-appearing band, a signal expressed as (eG) where (e) a coefficient of about 0.25±10% and (G) is the watts of radiation energy in said green-appearing band, and a signal expressed as (fR) where (f) is a coefficient of about 0.25±10% and (R) is the watts of radiation energy in said red-orange-appearing band; and combining the generated signals in the following manner: aB plus bG plus cR minus dY plus (the larger of eG and fR minus the smaller of eG and fR), and expressing said combined signals as a number.

2. The method as specified in claim 1, wherein said extracted narrow bands respectively peak at about 450 nm, about 540 nm, about 575 nm and about 610 nm.

3. The method as specified in claim 1, wherein said extracted narrow radiation bands each have a bandwidth of about 30 nm to about 60 nm when measured at a radiation intensity which is about 50% of the maximum measured radiation intensity thereof.

4. Apparatus for expressing as a number the relative brightness of artificial illumination as it is perceived by the average observer, which apparatus comprises:

means for extracting from the illumination to be measured, portions of the illumination spectrum which fall within the following radiation bands: a blue-appearing narrow band having a mean wavelength of from about 440 nm to about 460 nm, a green-appearing narrow band having a mean wavelength of from about 520 nm to about 540 nm, a yellow-appearing narrow band having a mean wavelength of from about 570 nm to about 590 nm, and a red-orange-appearing narrow band having a mean wavelength of from about 610 nm to about 630 nm;

means for generating from said four extracted radiation bands, a series of six signals which bear the following proportional relationship to one another: a signal expressed as (aB) where (a) is a coefficient of about 0.23±10% and (B) is the watts of radiation energy in said blue-appearing band, a signal expressed as (bG) where (b) is a coefficient of about 0.97±10% and (G) is the watts of radiation energy in said green-appearing band, a signal expressed as (cR) where (c) is a coefficient of about 0.33±10% and (R) is the watts of radiation energy in said red-orange-appearing band, a signal expressed as (dY) where (d) is a coefficient of about 0.19±10% and (Y) is the watts of radiation energy in said yellow-appearing band, a signal expressed as (eG) where (e) a coefficient of about 0.25±10% and (G) is the watts of radiation energy in said green-appearing band, and a signal expressed as (fR) where (f) is a coefficient of about 0.25±10% and (R) is the watts of radiation energy in said red-orange-appearing band; and means for combining the generated signals in the following manner: aB plus bG plus cR minus dY plus (the larger of eG and fR minus the smaller of eG and fR), and means for expressing said combined signals as a number.

5. The apparatus as specified in claim 4, wherein said radiation bands are extracted from the illumination to be measured by different interference filters each of which selectively passes a predetermined portion of the illumination to be measured, said interference filters having differing maximum transmissions respectively at mean wavelengths of from about 440 nm to about 460 nm, from about 520 nm to about 540 nm, for about 570 nm to about 590 nm and from about 610 nm to about 630 nm, and each of said interference filters having a transmission bandwidth of from about 30 nm to about 60 nm when measured at a relative transmission which is about 50% of the maximum measured transmission thereof.

6. The apparatus as specified in claim 5, wherein said interference filters have differing maximum transmissions respectively at about 450 nm, about 540 nm, about 575 nm and about 610 nm.

7. The apparatus as specified in claim 4 wherein:

four different photodiode means are actuated by different ones of said extracted radiation bands, said different photodiode means each generating individual output electrical signals which are proportional to the watts of energy in each of said different radiation bands;

first operational amplifier circuit means having its input connected to the output of said photodiode means which senses said blue-appearing band to generate an output electrical signal which is representative of said signal aB;

second operational amplifier circuit means having its input connected to the output of said photodiode means which senses said green-appearing band to generate an output electrical signal which is representative of said signal bG;

third operational amplifier circuit means having its input connected to the output of said photodiode means which senses said red-orange-appearing band to generate an output electrical signal which is representative of said signal cR;

fourth operational amplifier circuit means having its input connected to the output of said photodiode means which senses said yellow-appearing band to generate an output electrical signal which is representative of said signal dY;

first summation amplifier circuit means having its input connected to the outputs of said first, second and third operational amplifier circuit means to generate an output electrical signal which is representative of the sum of said signals aB, bG and cR;

fifth operational amplifier circuit means having its input connected in circuit with an output portion of said second operational amplifier circuit means to generate an output electrical signal which is representative of said signal eG;

sixth operational amplifier circuit means having its input connected in circuit with an output portion of said third operational amplifier means to generate an output electrical signal which is representative of said signal fR;

first difference amplifier circuit means having its input connected to the outputs of said fifth and sixth operational amplifier circuit means to generate an output electrical signal which is representative of the larger of said signals eG and fR minus the smaller of said signals eG and fR;

second summation amplifier circuit means having its input connected in circuit with the output of said first summation amplifier circuit means and the output of said first difference amplifier circuit means to generate an output electrical signal which is representative of the sum of said signals aB plus bG plus cR plus (the larger of eG and fR minus the smaller of eG and fR);

second difference amplifier circuit means having its input connected to the output of said second summation amplifier circuit means and the output of said fourth operational amplifier means to generate an electrical signal which is representative of the sum of said signals aB plus bG plus cR plus (the larger of eG and fR minus the smaller of eG and fR) minus dY; and display means connected to the output of said second differential amplifier circuit means to display the output electrical signal thereof as a number.

* * * * *